United States Patent
Yeggy et al.

(10) Patent No.: US 8,668,108 B2
(45) Date of Patent: Mar. 11, 2014

(54) PRESSURE VESSEL SHEAR RESISTANT BOSS AND SHELL INTERFACE ELEMENT

(76) Inventors: Brian Yeggy, Lincoln, NE (US); Ken Halvorsen, Lincoln, NE (US); Robert Bruce, La Grange, NC (US)

( * ) Notice: Subject to any disclaimer, the term of this patent is extended or adjusted under 35 U.S.C. 154(b) by 0 days.

(21) Appl. No.: 13/202,130

(22) PCT Filed: Feb. 18, 2010

(86) PCT No.: PCT/US2010/024522
§ 371 (c)(1),
(2), (4) Date: Oct. 25, 2011

(87) PCT Pub. No.: WO2010/096517
PCT Pub. Date: Aug. 26, 2010

(65) Prior Publication Data
US 2012/0037641 A1    Feb. 16, 2012

Related U.S. Application Data

(60) Provisional application No. 61/153,375, filed on Feb. 18, 2009.

(51) Int. Cl.
*F17C 1/00* (2006.01)
(52) U.S. Cl.
USPC .................................... 220/589; 220/581
(58) Field of Classification Search
USPC ......... 220/586, 581, 582, 588, 589, 592, 601, 220/661; 206/0.6
See application file for complete search history.

(56) References Cited

U.S. PATENT DOCUMENTS

| | | | |
|---|---|---|---|
| 3,132,761 A * | 5/1964 | Sylvester | 220/590 |
| 3,137,405 A | 6/1964 | Gorcey | |
| 3,596,795 A * | 8/1971 | D'Ercoli | 206/514 |
| 3,815,773 A * | 6/1974 | Duvall et al. | 220/590 |
| 3,843,010 A * | 10/1974 | Morse et al. | 220/590 |
| 3,847,716 A | 11/1974 | Dorsch | |
| 4,360,116 A * | 11/1982 | Humphrey | 220/586 |
| 4,369,894 A | 1/1983 | Grover | |
| 4,778,073 A | 10/1988 | Ehs | |
| 4,925,044 A | 5/1990 | Hembert | |
| 5,287,988 A * | 2/1994 | Murray | 220/589 |

(Continued)

FOREIGN PATENT DOCUMENTS

| | | |
|---|---|---|
| EP | 0261309 | 3/1988 |
| EP | 0666450 | 8/1995 |

(Continued)

OTHER PUBLICATIONS

English Translation of WO2007/079971.*

(Continued)

*Primary Examiner* — Steven A. Reynolds
(74) *Attorney, Agent, or Firm* — James L. Young; Westman, Champlin & Koehler, P.A.

(57) ABSTRACT

A pressure vessel has a composite shell; a boss defining a port in the composite shell and having a neck; and an interface element disposed between the composite shell and the boss. The interface element is neither bonded to the composite shell nor to the boss, thereby allowing for movement between the interface element and the composite shell and allowing for movement between the interface element and the boss. The interface element further includes a neck disposed adjacent the neck of the boss.

10 Claims, 3 Drawing Sheets

(56) References Cited

U.S. PATENT DOCUMENTS

| | | | |
|---|---|---|---|
| 5,429,845 A * | 7/1995 | Newhouse et al. | 428/34.1 |
| 5,476,189 A * | 12/1995 | Duvall et al. | 220/590 |
| 5,518,141 A * | 5/1996 | Newhouse et al. | 220/586 |
| 5,746,344 A | 5/1998 | Syler | |
| 5,819,978 A * | 10/1998 | Hlebovy | 220/601 |
| 5,839,600 A * | 11/1998 | Moreira et al. | 220/560.04 |
| 5,960,528 A * | 10/1999 | Kars | 29/511 |
| 5,979,692 A * | 11/1999 | West | 220/586 |
| 6,065,627 A * | 5/2000 | Johanson | 220/304 |
| 6,227,402 B1 * | 5/2001 | Shimojima et al. | 220/581 |
| 7,195,133 B1 | 3/2007 | Cundiff | |
| 7,549,555 B2 * | 6/2009 | Suzuki et al. | 220/581 |
| 7,954,660 B2 * | 6/2011 | Fishman | 220/304 |
| 8,087,537 B2 | 1/2012 | Otsubo et al. | |
| 2008/0251520 A1 * | 10/2008 | Ota et al. | 220/586 |
| 2010/0025411 A1 * | 2/2010 | Otsubo et al. | 220/581 |

FOREIGN PATENT DOCUMENTS

| | | |
|---|---|---|
| JP | 545123 | 3/1979 |
| JP | 2008-144943 | 6/2008 |
| WO | 01/31252 | 5/2001 |
| WO | 2007/079971 | 7/2007 |

OTHER PUBLICATIONS

First Office Action, European Patent Office, dated Jul. 9, 2012, from European Patent Application No. 10705712.7 (2 pages).

International Search Report and Written Opinion of International Searching Authority from corresponding PCT Application No. PCT/US2010/024522, 7 pages (Apr. 16, 2010).

Russian Office Action and English Translation dated May 17, 2013 for corresponding Russian Patent Application No. 2011138278 filed Feb. 18, 2010, 5 pages.

Russian Decision on Grant dated Aug. 20, 2013 in related Russian Patent Application No. 2091648, filed Feb. 18, 2010.

Japanese Office Action and English Translation dated Dec. 10, 2013 for corresponding Japanese Patent Application No. 2011551204 filed Feb. 18, 2010, 6 pages.

* cited by examiner

PRESSURE VESSEL SHEAR RESISTANT BOSS AND SHELL INTERFACE ELEMENT

CROSS-REFERENCE TO RELATED APPLICATION

This Application is a Section 371 National Stage Application of International Application No. PCT/US2010/024522, filed Feb. 18, 2010 and published as WO 2010/096517 on Aug. 26, 2010, in English, which was a non-provisional of U.S. Provisional Patent Application No. 61/153,375, filed on Feb. 18, 2009.

BACKGROUND

Pressure vessels are commonly used for containing a variety of fluids under pressure, such as storing oxygen, natural gas, nitrogen, hydrogen, propane and other fuels, for example. Suitable container materials include laminated layers of wound fiberglass filaments or other synthetic filaments bonded together by a thermosetting or thermoplastic resin. A polymeric or other non-metal resilient liner or bladder often is disposed within the composite shell to seal the vessel and prevent internal fluids from contacting the composite material. The composite construction of the vessels provides numerous advantages such as lightness in weight and resistance to corrosion, fatigue and catastrophic failure. These attributes are due to the high specific strengths of the reinforcing fibers or filaments that are typically oriented in the direction of the principal forces in the construction of the pressure vessels.

FIGS. 1 and 2 illustrate an elongated pressure vessel 10, such as that disclosed in U.S. Pat. No. 5,476,189, which is hereby incorporated by reference. Vessel 10 has a main body section 12 with end sections 14. A metal boss 16 (e.g., aluminum) is provided at one or both ends of the vessel 10 to provide a port for communicating with the interior of the vessel 10. The vessel 10 is formed from an inner polymer liner 20 covered by an outer composite shell 18. In this case, "composite" means a fiber reinforced resin matrix material, such as a filament wound or laminated structure. The composite shell 18 resolves all structural loads and the plastic liner 20 provides a gas barrier.

The liner 20 has a generally hemispheroidal end section 22 with an opening 24 aligned within an opening 26 in the outer composite shell 18. Boss 16 is positioned within the aligned openings and includes a neck portion 28 and a radially outwardly projecting flange portion 30. The boss 16 defines a port 32 through which fluid at high pressure may be communicated with the interior of the pressure vessel 10.

In some applications, vessel 10 is used as an accumulator. This application involves high cycle lives (pressurization/depressurizations) of vessel 10. The neck 28 and flange 30 of the aluminum boss 16 are rigid. However, under pressure, the composite shell 18 tends to strain. If composite shell 18 is in direct contact with the metal material of boss 16, such strain may result in spalling of the composite shell 18 during cycling of the accumulator due to wear on the composite shell 18 by the boss 16.

SUMMARY

In one aspect, the disclosure describes a pressure vessel comprising a composite shell; a boss defining a port in the composite shell and comprising a neck; and an interface element disposed between the composite shell and the boss, the interface element neither being bonded to the composite shell nor to the boss, thereby allowing for movement between the interface element and the composite shell and allowing for movement between the interface element and the boss, the interface element comprising a neck disposed adjacent the neck of the boss.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. Moreover, where terms such as above, below, over, under, top, bottom, side, right, left, etc., are used, it is to be understood that they are used only for ease of understanding the description. It is contemplated that structures may be otherwise oriented.

DETAILED DESCRIPTION

Figure 1:
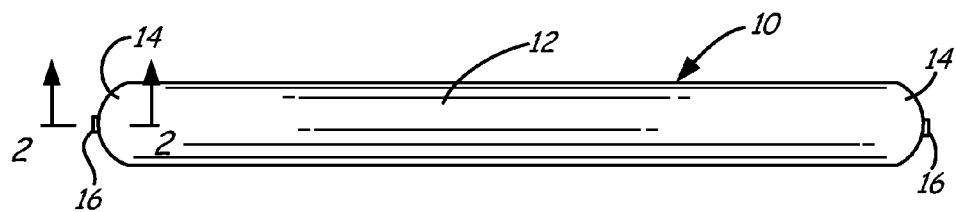
FIG. 1 is a side elevation view of a typical elongated pressure vessel.
Figure 2:
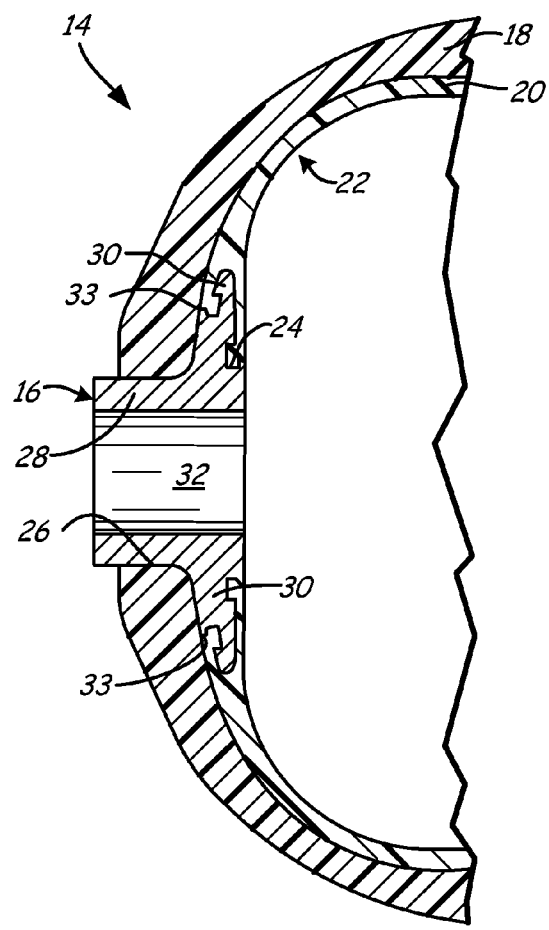
FIG. 2 is a partial cross-sectional view through one end of such a pressure vessel, taken along line 2-2 of FIG. 1.
Figure 3:
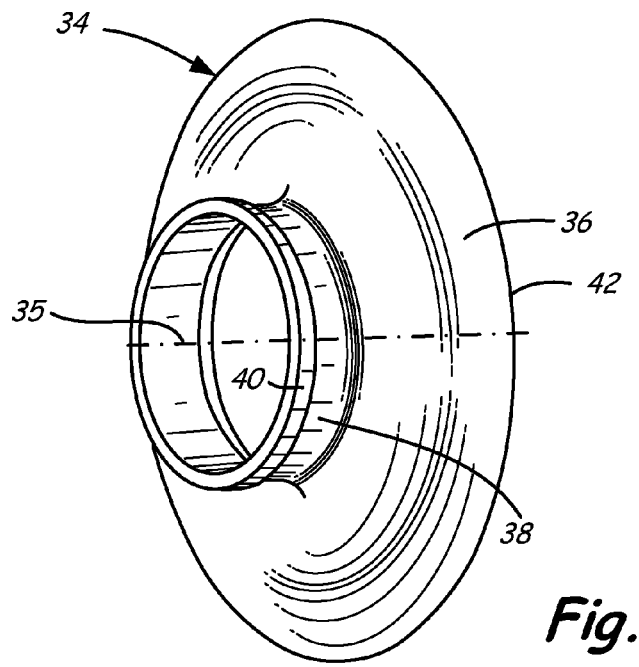
FIG. 3 is a perspective view of a first embodiment of a shear resistant boss and shell interface element of the present disclosure.
Figure 4:
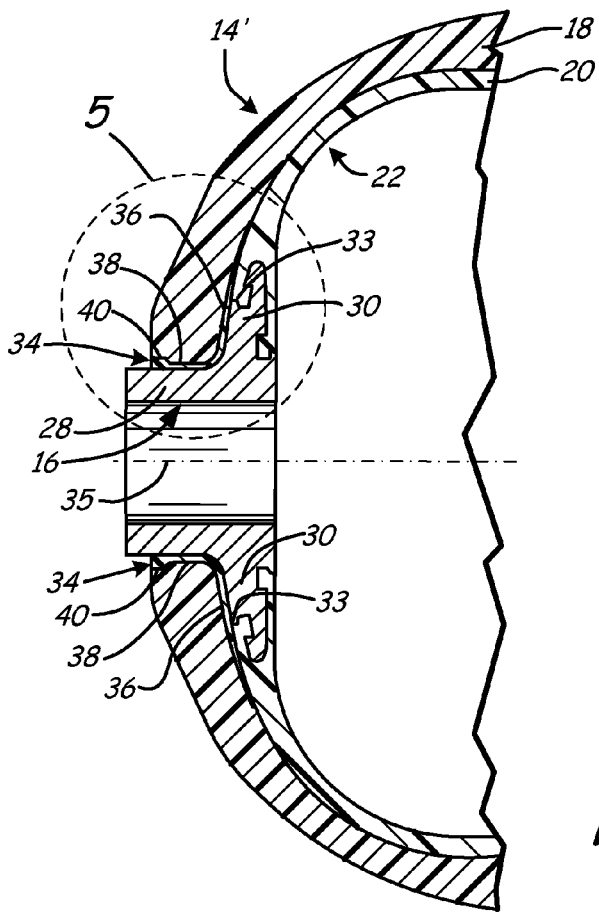
FIG. 4 is a partial cross-sectional view, similar to FIG. 2, of a pressure vessel containing the shear resistant boss and shell interface element of FIG. 3.
Figure 5A:
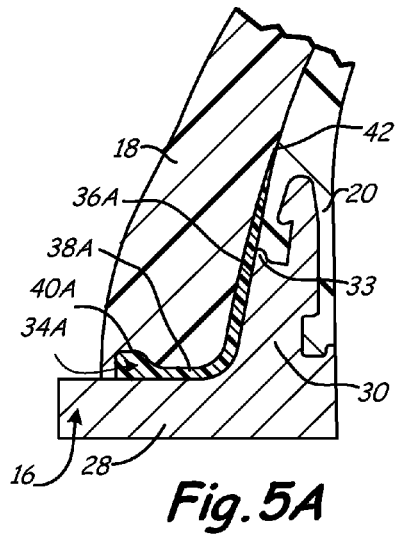
FIG. 5A is an enlarged partial cross-sectional view of the circled area of FIG. 4 (with reference number 5), showing a second embodiment of a shear resistant boss and shell interface element of the present disclosure.
Figure 5B:
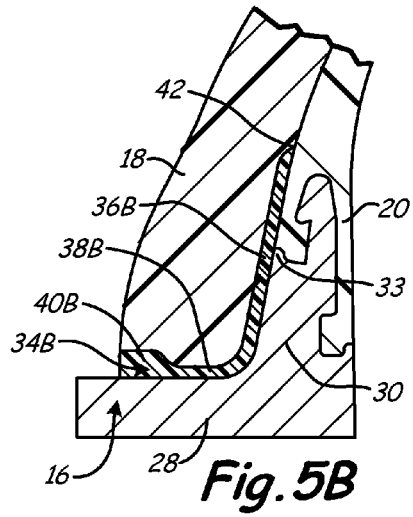
FIG. 5B is an enlarged partial cross-sectional view of the circled area of FIG. 4 (with reference number 5), showing a third embodiment of a shear resistant boss and shell interface element of the present disclosure.
Figure 5C:
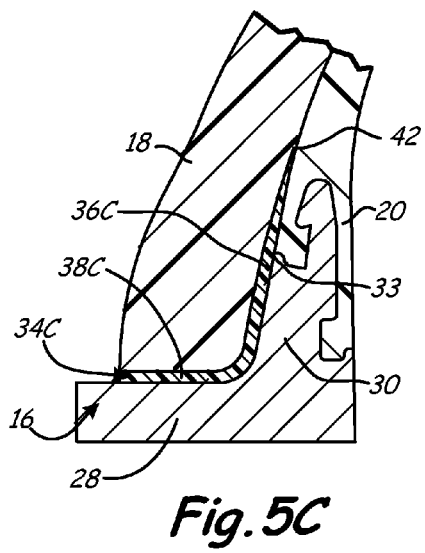
FIG. 5C is an enlarged partial cross-sectional view of the circled area of FIG. 4 (with reference number 5), showing a fourth embodiment of a shear resistant boss and shell interface element of the present disclosure.
Figure 5D:
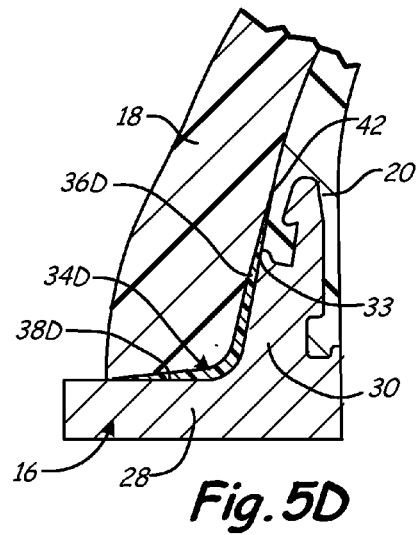
FIG. 5D is an enlarged partial cross-sectional view of the circled area of FIG. 4 (with reference number 5), showing a fifth embodiment of a shear resistant boss and shell interface element of the present disclosure.

After many cycles of pressurization and depressurization, spalling of composite shell 18 often occurs, especially at point 33 (see FIG. 2), where a tip of metal boss 16 contacts composite shell 18. A prior solution to this problem is described in U.S. Pat. No. 5,429,845, which is hereby incorporated by reference. In the present disclosure, an exemplary embodiment of vessel includes a shear resistant interface element 34-34D provided between boss 16 and composite shell 18, as shown in FIGS. 4-5D. While FIGS. 5A-5D show only half of the cross section of a pressure vessel, the other half is a minor image (around axis 35 of FIG. 4). Interface element 34-34D may also extend to an interface between composite shell 18 and liner 20 proximate boss 16. Interface element 34-34D is provided to create a flexible, high wear surface between the boss 16 and the composite shell 18. Exemplary configurations of interface element 34-34D are illustrated in FIGS. 3-5D. Interface element 34-34D helps the composite shell 18 slide over the boss 16 during pressurization and depressurization.

In an exemplary embodiment, interface element 34-34D is neither bonded to the composite shell 18 nor to the boss 16, thereby allowing for movement between the interface element 34-34D and the composite shell 18 and allowing for movement between the interface element 34-34D and the boss 16. By allowing such sliding to occur, the material used for interface element 34-34D need not allow for internal shear deformation or discontinuity of interface element 34-34D.

If the interface element 34-34D is made of a material such as rubber that is not resistant to shear forces, it may be consumed (i.e., ground up) by movement of the composite shell 18 relative to the boss 16. Accordingly, in an exemplary embodiment, interface element 34-34D is constructed of a material that is highly resistant to shear forces, such as polyoxymethylene (commonly referred to as POM and also known as polyacetal or polyformaldehyde), an engineering thermoplastic having high stiffness, low friction and excellent dimensional stability. It is commonly known under DuPont's trade name DELRIN™. Such an interface element material promotes high wear and low friction between interface element 34-34D and the composite shell 18, as well as between interface element 34-34D and the boss 16.

Other suitable materials include, for example, a polymer or elastomer reinforced with woven or chopped fibers. These materials may provide additional wear resistance for interface element 34-34D. Particularly suitable materials for interface element 34-34D have an elastic modulus that is greater than that of rubber (about 250 psi (pounds per square inch)) to avoid disintegration of interface element 34-34D. Moreover, particularly suitable materials for interface element 34-34D have an elastic modulus that is less than that of the metal boss material (elastic modulus of aluminum is about 10 Mpsi (Million pounds per square inch); elastic modulus of steel is about 29 Mpsi) to minimize a load concentration at the tip 33 of the boss 16 that could damage composite shell 18. Because of the higher loads or extended cycles to which the vessel may be subjected, the material for interface element 34-34D should be more substantial than the typically used rubber to avoid disintegration of the interface element 34-34D. For example, DELRIN™ has an elastic modulus of about 350 kpsi (thousand pounds per square inch).

In exemplary embodiments, interface element 34-34D includes neck 38, which contributes to a compliant structure that will not be prone to breaking up due to contact with the boss 16 and composite shell 18 and therefore protects the composite shell 18 from damage. In some embodiments, such as illustrated in FIGS. 4, 5B, 5C, and 5D, end 39 of neck 38, 38B, 38C, 38D extends the entire thickness of composite shell 18 proximate boss 16, so that composite shell 18 does not directly contact boss 16. In other embodiments, such as that illustrated in FIG. 5A, neck 38A does not extend the entire thickness of composite shell 18 proximate boss 16, so that composite shell 18 directly contacts boss 16. In some embodiments, such as that illustrated in FIG. 5C, neck 38C is straight (i.e., having a uniform thickness and extending parallel to the neck 28 of the boss 16). In other embodiments, such as illustrated in FIG. 5D, neck 38D tapers to a smaller thickness as it approaches end 39. In other embodiments, such as illustrated in FIGS. 4, 5A and 5B, neck 38, 38A, 38B has a lip 40, 40A, 40B adjacent end 39 and extending radially outwardly. Lip 40, 40A, 40B provides a mechanical interlock that prevents composite shell 18 from moving axially away from skirt 36, thereby maintaining firm engagement of interface element 34 and composite shell 18 axially, despite the adverse loading conditions to which the vessel 10 is subjected. In some embodiments, such as illustrated in FIG. 5B, a lower portion or skirt 36B of interface element 34B has a substantially uniform thickness and tapers only at the edge 42 to minimize stress discontinuities. In other embodiments, such as illustrated in FIGS. 4, 5A, 5C and 5D, skirt 36, 36A, 36C and 36D tapers to a smaller thickness as it extends radially outward from neck 38, 38A, 38C, 38D. Such a taper can result in better management of interface pressures and control of load distributions.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A pressure vessel comprising:
   a composite shell;
   a metallic boss defining a port in the composite shell and comprising a neck and an outwardly extending flange; and
   an interface element disposed between the composite shell and the boss, the interface element being in contact with the composite shell and in contact with the boss, the interface element neither being bonded to the composite shell nor to the boss, thereby allowing for movement between the interface element and the composite shell and allowing for movement between the interface element and the boss, the interface element comprising a neck disposed adjacent the neck of the boss, the interface element comprising a skirt disposed adjacent the flange of the boss, the interface element consisting essentially of a material selected from the group consisting of a polymer, an elastomer, and a thermoplastic, and the interface element having an elastic modulus that is greater than about 250 psi and less than about 10 Mpsi.

2. The pressure vessel of claim 1 wherein the interface element comprises polyoxymethylene.

3. The pressure vessel of claim 1 wherein the interface element comprises a plurality of fibers.

4. The pressure vessel of claim 3 wherein the fibers are woven.

5. The pressure vessel of claim 3 wherein the fibers are chopped.

6. The pressure vessel of claim 1 wherein the neck of the interface element comprises a lip that extends radially outward from an end of the neck of the interface element.

7. The pressure vessel of claim 1 wherein the neck of the interface element extends an entire thickness of the composite shell so that the composite shell does not contact the boss.

8. The pressure vessel of claim 1 wherein the neck of the interface element tapers toward an end thereof.

9. The pressure vessel of claim 1 wherein the skirt has a substantially uniform thickness.

10. The pressure vessel of claim 1 wherein the skirt tapers from the neck of the interface element toward an edge of the skirt.

* * * * *